Nov. 18, 1941.    W. J. GUILD    2,263,085
RETRACTING MECHANISM FOR BORING TOOLS
Filed May 22, 1939    2 Sheets-Sheet 1
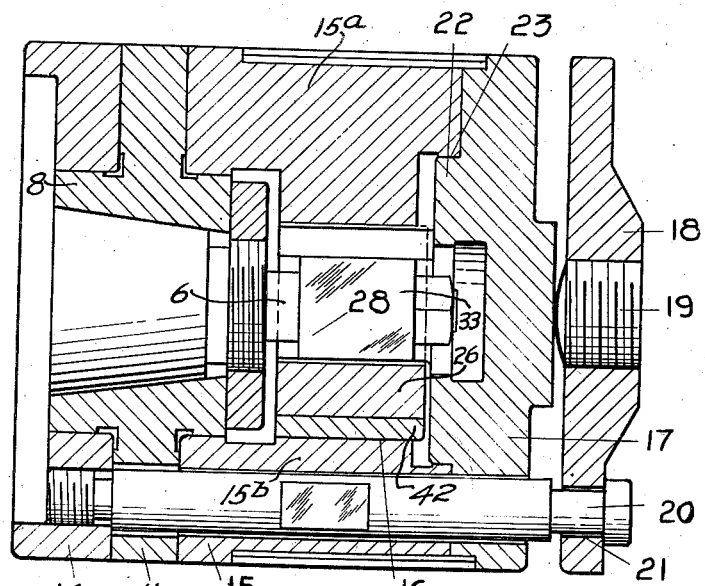
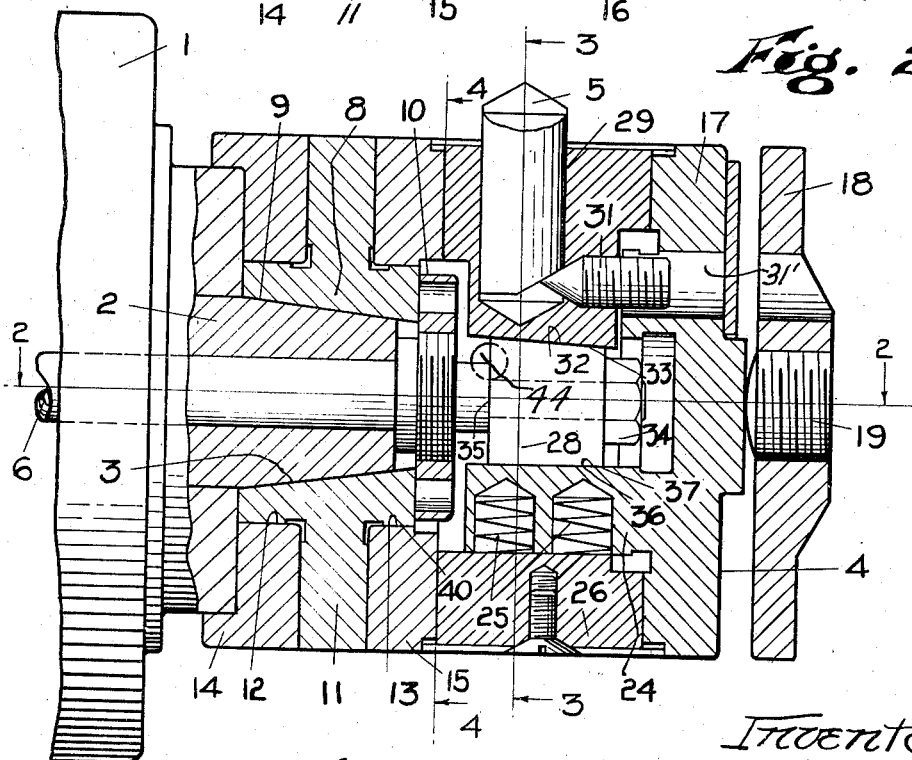
Inventor:
WALDO J. GUILD
By Geo. H. Kennedy Jr.
Attorney Nov. 18, 1941.  W. J. GUILD  2,263,085
RETRACTING MECHANISM FOR BORING TOOLS
Filed May 22, 1939  2 Sheets-Sheet 2
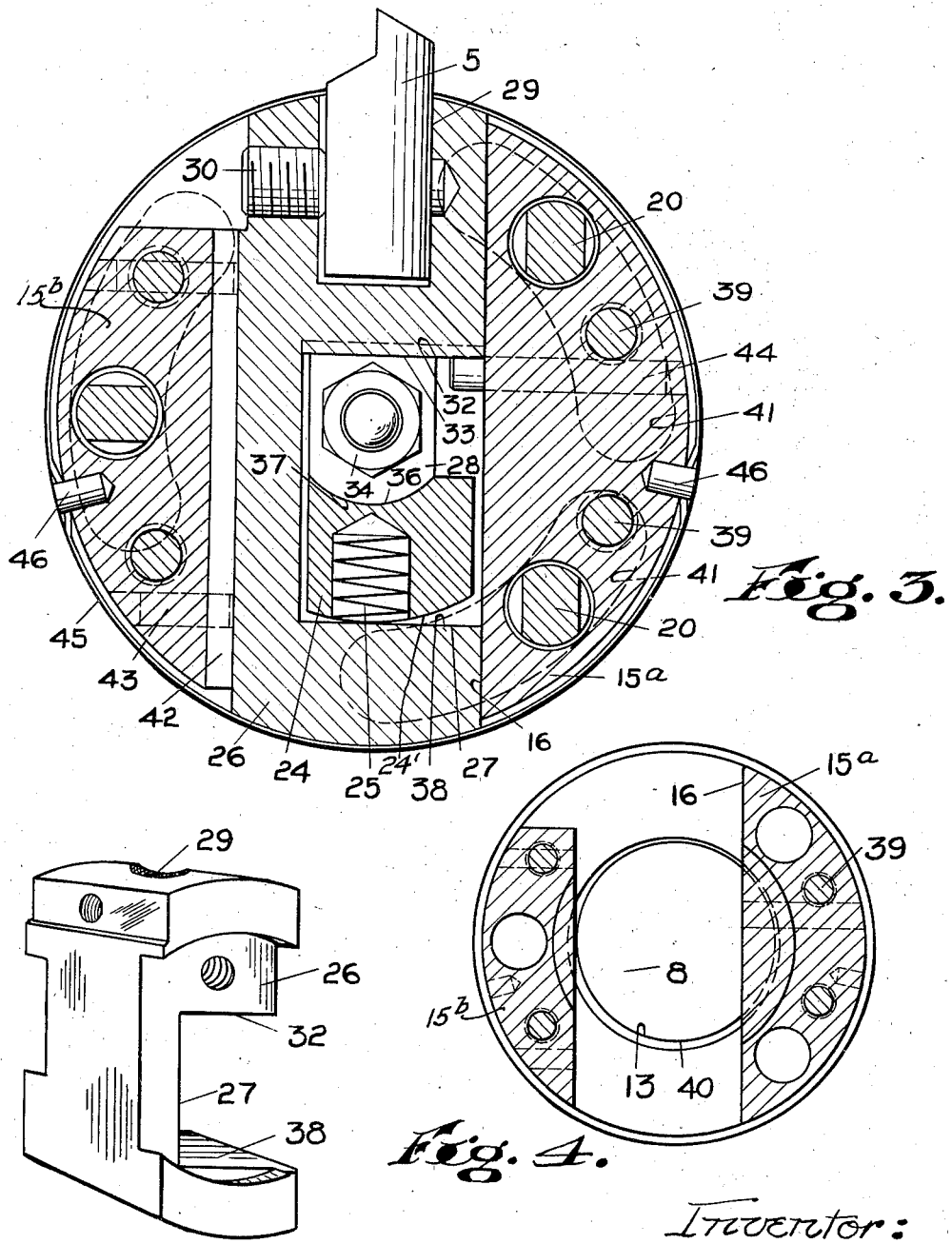
Inventor:
WALDO J. GUILD
By Geo. H. Kennedy Jr.
Attorney Patented Nov. 18, 1941

2,263,085

UNITED STATES PATENT OFFICE 2,263,085

RETRACTING MECHANISM FOR BORING TOOLS

Waldo J. Guild, Worcester, Mass., assignor to The Heald Machine Company, Worcester, Mass., a corporation of Massachusetts Application May 22, 1939, Serial No. 274,927

3 Claims. (Cl. 77—58)

The present invention relates to boring tools, and especially to an arrangement which enables such a tool, before being withdrawn from a workpiece bore on which it has operated, to be retracted or drawn in radially toward its axis of rotation, thereby preventing any scoring or scratching of the finished bore surface on said withdrawal movement.

My invention provides mechanism for obtaining this tool retraction in a very simple manner, involving relatively few moving parts, and insuring the subsequent return of the tool to exactly the same working position which it occupied prior to the retraction; also, according to my invention, the tool retracting mechanism is enabled to perform its function without interfering in any way with the ability of the tool to be adjusted inwardly or outwardly, relative to its axis of rotation.

Other and further objects and advantages of the invention will appear from the following detailed description taken in connection with the accompanying drawing, in which Fig. 1 is a view, partly in side elevation, illustrative of my invention, with the tool retracting mechanism shown in section.

Fig. 2 is a sectional view along the line 2—2 of Fig. 1, through the tool retracting mechanism, taken at right angles to the section of Fig. 1.

Fig. 3 is a larger scale sectional view along the line 3—3 of Fig. 2.

Fig. 4 is a smaller scale sectional view along the line 4—4 of Fig. 2.

Fig. 5 is a perspective view of the tool carrying member

Like reference characters refer to like parts in the different figures.

Referring to the drawings, Fig. 1 shows fragmentarily a suitable housing 1 having a spindle 2 journalled therein. Suitable bearings, not shown, are provided in the housing for assuring a substantially vibrationless rotation of the spindle 2. Any suitable means, not shown, may be employed to impart rotation to the spindle 2, the latter at its end projecting from the housing 1 having a tapered portion 3 to which is secured my improved tool retracting mechanism, designated generally by the numeral 4; the latter, as hereinafter described carries a boring tool 5. The spindle 2 is hollow and has an axially slidable rod 6 arranged therein, the movements of this rod in opposite directions procuring alternately the retraction of tool 5 and its return to operative position.

The tool retracting mechanism, as best shown in Figs. 1 and 2, includes a collet 8 having a tapered bore 9 engaging with the tapered portion 3 of the spindle. A clamping nut 10 holds the collet securely on the end of the spindle. The collet, as shown, has a radially extending flange 11, and on opposite sides of the flange provides cylindrical surfaces 12 and 13, the former being concentric to the axis of the spindle, and the latter being slightly eccentric, for a purpose which will hereinafter appear.

In engagement with the surface 12 is a ring 14, which also engages with the side of the flange 11 on the collet. On the other side of said flange and fitted to the surface 13 is a ring-like member 15, having spaced forwardly-extended portions 15a and 15b (Fig. 3) which provide between them a diametrical slot or passage 16, for the reception of a tool carrying member 26 (Fig. 5). A cap 17 engages the outer ends of the portions 15a and 15b, and the several elements are held in assembled relation by a clamping plate 18, having a centrally positioned stud 19 for engagement with the end of the cap. A plurality of bolts 20 threaded at their inner ends for engagement with the ring 14, pass loosely through the collet flange 11, the member 15 and the cap 17, as shown in Fig. 2. In said collet flange 11 the openings for the passage of bolts 20 are in the form of arcuate slots 41, 41, Fig. 3, for a purpose to be hereinafter described. The clamping plate 18 has a plurality of arcuate slots 21 which are large enough at one end, not shown, to receive the heads of the bolts 20 when the plate 18 is applied so as to register these larger portions with said bolt heads; the other portions of said slots 21 are of less width, as shown in Fig. 2, so that plate 18 so applied is turned through a slight angle, the bolt heads will serve to retain said plate in the position shown by Figs. 1 and 2.

The cap 17 has a projecting boss 22 centrally thereof which fits the similarly-shaped recesses 23, 23 of the portions 15a and 15b of member 15 (see Fig. 2). Between said portions 15a and 15b said cap boss 22 has an extension 24 which projects inwardly into the passage 16, and has spaced openings to receive coil springs 25, the outer ends of which are in contact with an inwardly-facing flat surface 38 (Figs. 3 and 5) provided by the tool-carrying member 26. The latter which has the form shown in Fig. 5 is positioned in and guided by the diametrical passage 16 between portions 15a and 15b, for movement radially of the member 15. The tool carrying member 26 has a notch 27, within which is received the extension 24, as well as a cam block 28 secured in any suitable way, as by a nut 34 to the shouldered end 35 of the rod 6. At one end of the member 26 is a radially extending bore 29, in which is positioned the boring tool 5, the latter being locked in position by a set screw 30. An adjusting screw 31 having a conical inner end, is arranged in the member 26 to engage the inner end of the boring tool, so that the position of the boring tool in the carrying member may be adjusted by turning of this screw 31, which is accessible for this purpose through a suitable opening 31' of the cap 17.

The tool carrying member 26 has an inwardly-facing surface 32 which is opposed to the aforesaid flat surface 38; this surface 32 is at a slight angle to the axis of spindle 2 for cooperation with a surface 33 of similar slope on the cam block 28. Thus, when cam 28 is moved by rod 6 to the right, Fig. 1, the tool 5 is disposed in its operative position, by the outward movement of the tool carrying member 26. The retraction of the boring tool is procured by the action of the coil springs 25, when the cam 28 is shifted to the left, Fig. 1, to allow the springs to force the member 26 in the other direction.

The cam 28 is rigidly supported against lateral movement within the tool carrying member 26 by the engagement between a convex surface 36 on the cam, opposite to the surface 33, and a corresponding concave surface 37 on the lug 24; thus the boring tool is positively moved outward to a predetermined operating position, when the actuating rod 6 is moved to the right, Fig. 1, to its limit of movement in this direction. The outward movement of the tool carrying member which shifts the tool into operative boring position is limited by a convex surface 24' of the cap extension 24, said surface opposing the surface 38 of tool-carrying member 26. This convexity gives substantially a line contact between these two surfaces, in consequence of which the position of the tool point is not appreciably affected by any variation in oil-film thickness between these opposed movement-limiting surfaces.

The cap 17 is held onto the ends of portions 15a and 15b by bolts 39, so that said cap and the member 15, together with the movably mounted tool carrying member 26, are held in assembled relation. These bolts 39, as shown, are suitably positioned relative to the long bolts 20, which hold the entire mechanism in assembled relation.

In addition to the coarse adjustment of boring tool 5, provided by the screw 31, my invention provides for a fine adjustment of the cutting point of the tool relative to the spindle's axis of rotation. To this end, as above stated, the surface 13 on the collet 8 is slightly eccentric (being greatly exaggerated in Fig. 4), and thereby provides for an adjustment of the eccentricity of the member 15 by turning this member relative to the collet 8. It will be noted that the member 15 has a surface 40 cooperating with the surface 13, and that this surface 40 is also eccentric to the center line of the member 15. The collet has arcuate slots 41, through which the bolts 20 extend, these slots permitting a turning movement of the member 15, and the parts mounted thereon, relative to the collet, so that any necessary adjustment of the position of the cutting point of the boring tool may be made. The periphery of the member 15 preferably has graduations thereon, not shown, indicating the direction for turning the member 15, in order to vary the radial position of the boring tool, and the collet 8 has a mark, also not shown, which cooperates with the graduations on the member 15, and which indicates the necessary degree of adjustment, in order that the point of the boring tool may be moved radially inward or outward a predetermined distance.

It will be noted, in connection with this provision for fine adjustment of the tool, that the cam 28, by reason of its close confinement between the surfaces 32 and 37, is invariably constrained to partake of the angular movements imparted to the assembly in obtaining such adjustments; thus the tool retraction is unaffected by the adjustment, and the latter is not interfered with in any way by the retracting mechanism.

As shown in Fig. 3, the tool carrying member 26 may be held securely against vibration between the portions 15a and 15b of member 15, by a gib or filler strip 42 inserted in the passage 16 between the members. This strip is preferably held in position by pins 43 in the portion 15b. The portion 15a has an inwardly projecting pin 44 engaging in the notch 27 in the member 26, which limits the amount of retraction of the boring tool by engaging with the surface 32. It may be desirable to protect the working parts of the tool retracting mechanism from chips or dirt, and for this purpose there is provided a substantially circular covering plate 45, which is held in position on the portions 15a and 15b by suitable pins 46.

The above described coarse and fine adjustments of the boring tool 5 are preferably effected with the cam 28 in its right hand position, Figs. 1 and 2, that disposes the tool-carrying member 26 at the limit of its outward radial movement. Then, in operation, after the tool has traversed each workpiece bore, and prior to any withdrawal of the boring tool from said bore, the mechanism which has been utilized to hold the rod 6 in its right-hand position, is operated, either automatically or manually, to move the rod to the left, thereby causing the tool carrying member 26, under the action of the springs 25, to move a little inwardly, so as to offset the boring tool inwardly from its normal operative position, and thereby prevent contact between the finished surface of the workpiece and the point of the tool, during the ensuing withdrawal of said tool from the workpiece bore.

The mechanism by which the rod 6 is axially shifted is not a feature of the invention. It may be noted, however, that this rod may readily be actuated at the reversal of the movement of the reciprocatory table or carriage, usually provided in boring machines to obtain the passage of the tool endwise through the workpiece. Such a table or carriage is frequently actuated by fluid under pressure, and this same fluid pressure under the control of the reversing means for the reciprocatory carriage, may also be utilized for shifting the rod 6, as will be apparent.

I claim:

1. In mechanism of the class described, a rotary spindle, a member mounted on the end of said spindle for rotation therewith, a slide supported by said member for movement radially of the spindle, means associated with said member for limiting the movement of the slide in one direction, a boring tool carried by the slide, a rod axially slidable within the spindle and a cam mounted on said rod and engageable with said slide for moving said slide into a position where the limiting means are operative, said member having means for supporting the cam at a point opposite to its engagement with the slide.

2. In mechanism of the class described, a rotary spindle, a head carried by said spindle for rotation in unison therewith, a tool carrying member slidable radially in said head, a rod slidable axially of said spindle, a cam on said rod, engaging said member, to procure by said rod's movement in opposite directions, the operative positioning and the retraction from operative position, of the tool carried by said member, said head being eccentrically mounted on said spindle for angular adjustment, to vary the projection of said tool from the spindle axis, and means for constraining said cam to move angularly, in unison with the adjusting movement of said head.

3. In mechanism of the class described, a rotary spindle, a head attached to said spindle for rotation in unison therewith, said head being eccentrically mounted on said spindle, a tool-carrying member slidable radially in said head, a tool in said member whose operative position is varied by angular movement of said head on said mounting, a rod axially slidable in said spindle, a cam on said rod to impart outward radial movement to said member, thereby to operatively position the tool, when said rod is moved in one direction, a spring for producing inward radial movement of said member to retract said tool when the rod is moved in the other direction, and means for procuring angular movements of said cam and rod in unison with said angular tool-adjusting movements of said head.

WALDO J. GUILD.